United States Patent
Negishi et al.

(10) Patent No.: US 6,870,861 B1
(45) Date of Patent: Mar. 22, 2005

(54) DIGITAL SIGNAL MULTIPLEXING METHOD AND APPARATUS, DIGITAL SIGNAL TRANSMISSION METHOD AND APPARATUS, DIGITAL SIGNAL RECORDING METHOD APPARATUS AND RECORDING MEDIUM

(75) Inventors: Shinji Negishi, Kanagawa (JP); Katsumi Tahara, Kanagawa (JP); Mikita Yasuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/235,711

(22) Filed: Jan. 22, 1999

(30) Foreign Application Priority Data

Jan. 26, 1998 (JP) ............................................. 10-013000

(51) Int. Cl.[7] ................................................. H04J 3/02
(52) U.S. Cl. ........................ 370/537; 370/539; 370/541
(58) Field of Search ................................ 370/532, 535, 370/536, 537, 538, 539, 540, 541, 542, 543, 544, 353, 354, 376, 389, 392, 394, 412, 415, 417

(56) References Cited

U.S. PATENT DOCUMENTS

| | | | | |
|---|---|---|---|---|
| 5,650,825 A | * | 7/1997 | Naimpally et al. | 370/528 |
| 5,877,814 A | * | 3/1999 | Reininger et al. | 348/400 |
| 5,881,203 A | * | 3/1999 | Fujinami et al. | 386/96 |
| 5,970,072 A | * | 10/1999 | Gammenthaler, Jr. et al. | 370/537 |
| 5,995,507 A | * | 11/1999 | Fujita | 370/395.71 |
| 6,088,372 A | * | 7/2000 | Numata | 370/539 |
| 6,097,435 A | * | 8/2000 | Stanger et al. | 370/468 |

* cited by examiner

*Primary Examiner*—Phirin Sam
(74) *Attorney, Agent, or Firm*—Frommer Lawrence & Haug LLP; William S. Frommer; Gordon Kessler

(57) ABSTRACT

A digital signal multiplexing device packetizes one or more bitstreams of digital signals to form packets and multiplexes the respective bitstreams on the packet basis to produce plural degree-one multiplexed streams which are received. The digital signal multiplexing device also sets the sequence of time-divisional multiplexing of the packets as interleaving patterns repeated at a pre-set period. The digital signal multiplexing device time-divisionally multiplexes the degree-one multiplexed streams on the packet basis to generate a degree-two multiplexed stream.

31 Claims, 13 Drawing Sheets

TRANSPORT PACKET ASTRIDE RATE ALLOTLING DOMAIN BOUNDARY

TRANSPORT PACKET BELONGING TO T(k) FOR MULTIPLEXING IS LEFT

TRANSPORT PACKET BELONGING TO T(k) FOR MULTIPLEXING IS NOT LEFT

DIGITAL SIGNAL MULTIPLEXING METHOD AND APPARATUS, DIGITAL SIGNAL TRANSMISSION METHOD AND APPARATUS, DIGITAL SIGNAL RECORDING METHOD APPARATUS AND RECORDING MEDIUM

BACKGROUND OF THE INVENTION

1. Field of the Invention

This invention relates to a signal multiplexing method and apparatus for multiplexing digital picture or speech signals to generate degree-one multiplexed television-program-based streams, degree-two multiplexing these plural degree-one multiplexed streams to generate a degree-two multiplexed stream to transmit or record the generated degree-two multiplexed stream, a digital signal transmission method and apparatus, a digital signal recording method and apparatus. This invention also relates to a recording medium having the multiplexed data recorded thereon.

2. Description of the Related Art

In ISO 13818-1, there is prescribed a transport stream for multiplexing plural programs, such as television broadcast programs, into a sole multiplexed stream, and transmitting the multiplexed stream. Up to now, there is known a multiplexing system for generating this transport stream.

FIG. 1 shows a structure of a broadcast system transmitting this transport stream using, for example, a digital broadcasting satellite.

To a transmitting device 101, base band video or audio data, associated with plural programs Pa to Pn, are sent from a server or a video camera. These video or audio data are sent to video encoders 102a to 102n and to audio encoders 103a to 103n, associated with the programs Pa to Pn, respectively, so as to be encoded to compressed data streams (elementary streams) conforming to, for example, MPEG (ISO/IEC11172, ISO133818).

The encoded elementary streams are sent to degree-one multiplexers 104a to 104n associated with the programs Pa to Pn, respectively. The degree-one multiplexers 104a to 104n time-divisionally multiplex the respective degree-one multiplexed streams on the transport packet basis to generate a sole degree-two multiplexed stream.

The degree-two multiplexer 105 sends the generated degree-two multiplexed stream via a transmission medium 110 to a reception device 111.

The degree-one multiplexed streams and the degree-two multiplexed stream, obtained on multiplexing by the degree-one multiplexers 104a to 104n and the degree-two multiplexer 105, respectively, conform to the transport stream prescribed in ISO13818-1.

The transmission device 101 thus encodes the base-band video or audio data, associated with the programs Pa to Pn, to generate a sole degree-two multiplexed stream, which is sent to the reception device 111 via transmission medium 110.

The degree-two multiplexed stream is transmitted via the transmission medium 110 to the reception device 111. Specifically, the degree-two multiplexed stream is sent to a separator 112. The separator 112 separates only the elementary stream associated with the program specified by the viewer from the degree-two multiplexed stream to send the separated elementary stream to a decoder. That is, the separator 112 sends the video elementary stream of the specified program to a video decoder 113, while sending the audio elementary stream of the specified program to an audio decoder 114.

The video decoder 113 and the audio decoder 114 expands or decodes the compressed or encoded data to generate baseband video and audio data which are sent to an external equipment, not shown.

The reception device 111 thus receives the supplied degree-two multiplexed stream to select the predetermined program from the plural programs contained in the degree-two multiplexed stream by way of decoding.

FIG. 2 shows data structures of the degree-one multiplexed streams and the degree-two multiplexed stream, as the transport stream prescribed by the ISO13818-1.

The video elementary streams, encoded by the video encoders 102a to 102n, and audio elementary streams, encoded by the audio encoders 103a to 103n, are split into packets termed PES packets. The associated degree-one multiplexers 104a to 104n split the elementary streams into fixed-length transport packets, each being of 188 bytes, and time-divisionally degree-one multiplex the elementary streams on the transport packet basis to generate degree-one multiplexed streams. The degree-two multiplexer 105 time-divisionally degree-two multiplexes the respective degree-one multiplexed streams on the transport packet basis to generate the degree-two multiplexed stream.

FIG. 3 shows a decoder model of the reception device 111 in case the transport stream prescribed by the above-mentioned ISO13818-1 is supplied thereto.

A splitter 112 selects only the transport packets associated with the program and which have been selected by the viewer from the degree-two multiplexed stream to distribute the selected packets to transport buffers 116 to 118. These transport buffers 116 to 118 transiently store the transport packets of the associated data. Specifically, the transport buffer 116 stores the transport packet of video data of the selected program, the transport buffer 117 stores the transport packet of audio data of the selected program and the transport buffer 118 stores the transport packet of program control data of the selected program. Although the transport buffer for title data etc is not shown, transport packets of title data, for example, if contained in the selected program, are stored in the associated transport buffers.

Each of the transport buffers 116 to 118 has a capacity of, for example, 512 bytes, and proceeds to leak the PES packets at a prescribed rate as long as data are stored therein.

The video data leaked from the transport buffer 116 is sent to a multiplexer 119. The audio data and the program control data, leaked from the transport buffers 117, 118, are sent to associated elementary buffers 121, 122.

From the multiplexer 119, only the elementary stream is leaked at a prescribed bitrate so as to be sent to the elementary buffer 120.

At each decoding time point, decoders 123 to 125 extracts elementary streams from the associated elementary buffers 121, 122, every decoding unit (termed an accessing unit) or every picture unit if the data is video data, to carry out decoding. The video data is decoded, using a re-order buffer 126, for chronologically displaying pictures. The base-band video and audio data and control data, thus decoded, are sent to an external equipment or to a system controller.

By the above-described model, the reception device 111 decodes the transport stream prescribed by the above-mentioned ISO13818-1.

In the above-described broadcast system, employing digital satellite broadcast, it is possible to transmit transport streams, obtained on multiplexing data compressed every plural programs by the transmitting device 101, and to demultiplex and decode the data by the reception device 111.

Meanwhile, the total size of the multiplexing buffer 119 and the elementary buffer 120 (121, 122) is the sum of the buffer size of the video buffering verifier (VBV) for controlling the amount of the generated codes and a size uniquely determined by the profile and the level prescribed in ISO13818-2. This sum is referred to hereinafter as a decoder buffer. Thus, each encoder of the transmitting device 101 controls the amount of the generated codes so as to prevent underflow or overflow of the decoder buffer, that is so as not to cause failure of the decoder buffer. The degree-one multiplexers 104a to 104n similarly performs scheduling and multiplexing such as to evade underflow or overflow of the decoder buffer.

Meanwhile, in a multiplexing system used in the above-described broadcast system, that is in a multiplexing system in which degree-one multiplexed streams are further multiplexed to produce a sole degree-two multiplexed stream, there is produced, for the following reason, a time deviation between an output timing of the degree-one multiplexed streams, scheduled by the degree-one multiplexers, and an output timing of the degree-one multiplexed streams multiplexed into the degree-two multiplexed stream.

Specifically, there is produced, in this degree-two multiplexing system, a time deviation between respective output timings of the degree-one multiplexed streams multiplexed into the degree-two multiplexed stream due to the facts that degree-two multiplexing is possible only in transport-packet-based time slots in the bitrate of the degree-two multiplexed stream, the bitrate of the degree-two multiplexed stream is higher than that of the degree-one multiplexed streams, and that, since it is only the transport packet of a sole degree-one multiplexed stream that can be degree-two multiplexed into a given time slot, the transport packet of the degree-one multiplexed stream outputted by the degree-one multiplexer substantially simultaneously is kept in a waiting state. The time deviation between the output timings of the degree-one multiplexed streams scheduled by the respective degree-one multiplexers and the output timings of the degree-one multiplexed streams multiplexed into the degree-two multiplexed stream is termed a degree-two multiplexing jitter.

Thus, even if, in the multiplexing system, the respective degree-one multiplexers are scheduled for multiplexing so as not to cause failure of the decoder buffer provided upstream of the decoder, the decoder buffer is susceptible to failure under the effect of deviation caused by the degree-two multiplexing jitter in the arrival timing of the data stream at the decoder buffer or under the effect of deviation in the time reference encoded in the degree-two multiplexed stream or in the program check reference (PCR) in the case of the transport stream prescribed in ISO13818-1.

These two effects in the multiplexing system are scrutinized in more detail.

Referring first to FIGS. 4A to 4D, the deviation in the arrival timing of the data stream at the decoder buffer due to degree-two multiplexing jitter is explained. Meanwhile, FIGS. 4A to 4D illustrate a degree-one multiplexed stream of a predetermined program into which are multiplexed a video elementary stream and an audio elementary stream, a degree-two multiplexed stream into which are multiplexed the above-mentioned predetermined program and other programs, the buffer occupation volume of the decoder buffer envisaged by the degree-one multiplexers and the buffer occupation volume of the decoder buffer corrupted with the degree-two multiplexing jitter, respectively.

The degree-one multiplexed stream is video or audio data multiplexed every transport packet (N, N+1, N+2, N+3, ...) constituted by the packet header and the elementary stream, as shown in FIG. 4A.

The degree-two multiplexed stream is composed of degree-one multiplexed streams shown in FIG. 4A and other degree-one multiplexed streams, degree-two multiplexed at a bitrate higher than the bitrate of the degree-one multiplexed streams, as shown in FIG. 4B.

It is noted that the degree-one multiplexed streams are scheduled and multiplexed so as not to produce overflow or underflow in the decoder buffer. Thus, the video data contained in the pre-set transport packet, such as the transport packet N+1, is decoded without causing failure of the decoder buffer, while audio data contained in the pre-set transport packet, such as the transport packet N+3, is also decoded without causing failure of the decoder buffer, as shown in FIG. 4C.

However, since the degree-two multiplexed stream is of a bitrate higher than the degree-one multiplexed streams, the packet data storage end timing of the degree-two multiplexed stream is occasionally earlier than that of the degree-one multiplexed streams, even if the input start timing of the transport packet into the decoder buffer in the degree-two multiplexed stream is the same as that in the degree-one multiplexed streams. The result is that the end timing of packet data storage into the decoder buffer becomes faster than the timing envisaged by the degree-one multiplexers. Thus, the end timing of packet data storage in the decoder buffer becomes faster than the timing envisaged by the degree-one multiplexers. In such transport packet, such as transport packet N+1, the buffer occupation volume exceeds the decoder buffer size to produce overflow, as shown in FIG. 4D.

Also, since the degree-two multiplexed stream is corrupted with the degree-two multiplexing jitter, the transport packet input start timing to the decoder buffer is occasionally later than that in the degree-one multiplexed streams, such that the packet data storage start timing to the decoder buffer is later than the timing envisaged by the degree-one multiplexed streams. In such transport packet, such as transport packet N+3, the buffer occupation volume is smaller than zero, as shown in FIG. 4D, thus producing the underflow.

Next, description is made of the deviation produced in the time reference value (PCR) encoded in the degree-two multiplexed stream due to the degree-two multiplexing jitter.

The PCR is encoded into the packet header of a predetermined transport packet. This PCR denotes the data input time to a decoder. The decoder of the reception device is actuated in synchronism with system clocks of the reception device based on the actual input timing of byte data including the last bit of the PCR base field and on the PCR value. That is, both the value itself of the PCR and the arrival timing of the PCR at the decoder, that is the timing of actual output timing of the multiplexer, are meaningful. Therefore, if degree-two multiplexing jitter is produced in the transport packet, into which is encoded the PCR, such as the transport packet N+2 shown in FIG. 4, there is produced time deviation between the PCR output timing and the value of the PCR' shown in FIG. 4B, such that synchronization cannot be achieved in the decoder. The ISO13138-1 provides that only the PCR deviation up to ±500 nanosecond is allowed.

Thus, in the conventional multiplexing system, the following processing is generally adopted in order to overcome the inconveniences of deviation in data stream arrival timing at the decoder buffer and of deviation of the time reference PCR encoded in the degree-two multiplexed stream.

That is, in the conventional multiplexing system, an imaginary buffer occupation volume of the decoder buffer is presumed, in generating the degree-one multiplexed streams by the degree-one multiplexers, and a pre-set margin is provided for each of the upper and lower values of the buffer occupation volume of the decoder buffer in order to effect multiplexing. The result is that, in the conventional multiplexing system, such a degree-two multiplexed stream is produced which does not produce failure in the decoder buffer even if the data stream arrival timing at the decoder buffer is earlier or later due to the degree-two multiplexing jitter. Also, in the conventional multiplexing system, a PCR correction unit for correcting the PCR of the degree-two multiplexed stream is provided downstream of the degree-two multiplexer. The result is that if, in the conventional multiplexing system, the PCR is deviated due to the degree-two multiplexing jitter, such a degree-two multiplexed stream can be realized which enables synchronization to be achieved at the decoder of the reception device.

Referring to FIG. 5, a conventional multiplexing system 150 which overcomes these two problems is explained.

The conventional multiplexing system 150 includes plural degree-one multiplexers 151a to 151n and a degree-two multiplexer 152. This degree-two multiplexer 152 is made up of reception memories 153a to 153n, associated with the degree-one multiplexers 151a to 151n, respectively, a switching unit 154 for switching between the degree-one multiplexed streams stored in the reception memories 153a to 153n to multiplex the selected degree-one multiplexed streams, a controller 155 for controlling the switching unit 154 and a time information correction unit 156 for correcting the PCR of the degree-two multiplexed stream generated by the switching unit 154.

The degree-one multiplexers 151a to 151n provide a pre-set margin for each of the upper and lower values of the buffer occupation volume of the data buffer to generate degree-one multiplexed streams of code volumes which do not cause the failure of the decoder buffer. The degree-one multiplexed streams are sent to the associated reception memories 153a to 153n.

The reception memories 153a to 153n transiently store the degree-one multiplexed streams generated by the degree-one multiplexers 151a to 151n.

The controller 155 monitors the memory occupation volumes of the reception memories 153a to 153n to select the degree-one multiplexed streams to be degree-two multiplexed in the arrival sequence of the degree-one multiplexed streams or in the sequence of the decreasing memory occupation volumes to control the switching unit 154.

The switching unit 154 switches between the reception memories 153a to 153n to multiplex the selected streams, under control by the controller 155, in order to generate the degree-two multiplexed stream.

The time information correction unit 156 rewrites the value of the PCR of the degree-two multiplexed stream generated by the switching unit 154 to a timing of the actual occurrence of the degree-two multiplexing.

Thus, with the conventional multiplexing system 150, the input data is multiplexed by the degree-one multiplexers 151a to 151n with a margin so as not to cause failure of the decoder buffer, and the PCR value is rewritten by the time information correction unit 156, in order to generate the degree-two multiplexed stream which does not cause failure of the decoder buffer and which enables synchronization to be achieved with the transmission device by the decoder of the reception device.

In the above-described conventional multiplexing system 150, the controller 155 monitors the memory occupation volumes of the reception memories 153a to 153n to select the degree-one multiplexed streams for degree-two multiplexing in the sequence of arrival of the degree-one multiplexed streams or in the decreasing order of the memory occupation volumes. The result is that the degree-one multiplexed streams needs to be sent in real-time from the degree-one multiplexers 151a to 151n to the reception memories 153a to 153n. That is, if the transfer to the reception memories 153a to 153n is delayed, the priority sequence of the transport packet of the delayed degree-one multiplexed stream is lower than that of the remaining degree-one multiplexed streams, thus producing significant degree-two multiplexing jitter.

The result is that, in the conventional multiplexing system 150, the degree-one multiplexed streams need to be transferred from the degree-one multiplexers 151a to 151n to the reception memories 153a to 153n by a dedicated transfer system, such that the burst-like data transfer system, such as peripheral component interconnect (PCI) system, used in computers in general, cannot be used.

Also, if, in the conventional multiplexing system 150, the transport packets of all degree-one multiplexed streams arrive at the reception memories 152a to 152n substantially simultaneously, there is produced the degree-two multiplexing jitter corresponding to (I-1) packets at the maximum, where I is the number of the degree-one multiplexed streams, on multiplexing the degree-one multiplexed streams in the degree-two multiplexed stream. The result is the increased margin of the buffer occupation volume of the decoder buffer provided for multiplexing by the degree-one multiplexers 1151a to 151n, thus the degree of freedom in multiplexing being lost.

Moreover, in the conventional multiplexing system 150, the system configuration is complex because the PCR is corrected by the time information correction unit 156.

SUMMARY OF THE INVENTION

It is therefore an object of the present invention to provide a signal multiplexing method and apparatus, a digital signal transmission method and apparatus, a digital signal recording method and apparatus and a recording medium having the multiplexed data recorded thereon, in which the degree-two multiplexing jitter can be suppressed and in which the degree of freedom of multiplexing of the degree-one multiplexers is assured to effect multiplexing without correcting the time reference value.

The digital signal multiplexing method and apparatus, digital signal transmission method and apparatus, digital signal recording method and apparatus and recording medium according to the present invention are characterized by receiving a plurality of degree-one multiplexed streams obtained on packetizing one or more bitstreams of the digital signals to form packets and on multiplexing the bitstreams on the packet basis, by setting the sequence of time-divisional multiplexing of the packets as interleaving patterns repeated at a preset period and by controlling the packets selected on the basis of the interleaving patterns thus set to time-divisionally multiplex the received degree-one multiplexed streams on the packet basis to generate a degree-two multiplexed stream.

The digital signal multiplexing method and apparatus, digital signal transmission method and apparatus, and the digital signal recording method and apparatus set the time-divisional multiplexing sequence of the packets as interleaving patterns repeated at a pre-set period to generate a degree-two multiplexed stream.

Thus, it is possible to suppress the degree-two multiplexing jitter and to secure the freedom in multiplexing of the degree-one multiplexing units to realize multiplexing without correcting the time reference value.

That is, with the present invention, in which the sequence of the transport packets to be multiplexed can be uniquely set in advance by employing the interleaving patterns, the degree-two multiplexing can be rendered previously known, while the degree-two multiplexing jitter can be suppressed to a minimum. Thus, with the present invention, the degree-two multiplexed stream can be produced without the risk of failure of the decoder buffer.

Also, with the present invention, in which the interleaving patterns are used, the degree-two multiplexing jitter of the packet, to which the time reference is attached, can be reduced to zero, so that there is no necessity of correcting the time reference value, thus simplifying the system configuration. Also, with the present invention, in which the interleaving patterns are used, the burst-like transfer system, not operating in real-time, can be used for transferring the degree-one multiplexed streams, thus assuring the degree of freedom of the degree-one multiplexing units.

According to the present invention, the bitrate allocated to the degree-one multiplexed streams can be changed by setting the rate allocation domain and by changing the interleaving patterns every rate allocation domain. Thus, for example, control by statistic multiplexing can be performed by using variable bitrates of the degree-one multiplexed streams and by performing control so that the bitrate of the degree-two multiplexed stream as a comprehensive bit rate will be rendered constant. The result is that the bitrate can be distributed depending on the encoding difficulty of the degree-one multiplexed streams to improve the overall picture quality.

According to the present invention, if there is a packet lying astride a rate allocation domain, a dummy packet can be inserted, or the interleaving pattern can be aborted to set the interleaving patterns independently of the bitrates of the degree-one multiplexed streams.

If there exists a packet of the degree-one multiplexed stream lying astride the boundary of the rate allocation domain, and if the packet is left in a rate allocation domain to be multiplexed, the packet may be multiplexed on the assumption that said packet belongs to the rate allocation domain. If conversely the packet is not left in the rate allocation domain to be multiplexed, the packet may be multiplexed on the assumption that said packet belongs to the next rate allocation domain. In this manner, the bitrate of the degree-two multiplexed stream can be kept constant, while the rate allocation domain can be set without dependency on the bitrate of the degree-two multiplexed stream.

In the recording medium of the present invention, there is recorded thereon a degree-two multiplexed stream generated on setting the time-divisional multiplexing sequence of the packets as interleaving patterns repeated at a pre-set period and on controlling the packet for selection based on the so-set interleaving patterns.

Thus, with the recording medium according to the present invention, there can be recorded a degree-two multiplexed stream obtained on multiplexing with small degree-two multiplexing jitter and with sufficient degree of freedom of the degree-one multiplexers without correcting the time reference value.

DESCRIPTION OF THE PREFERRED EMBODIMENTS

Figure 1:
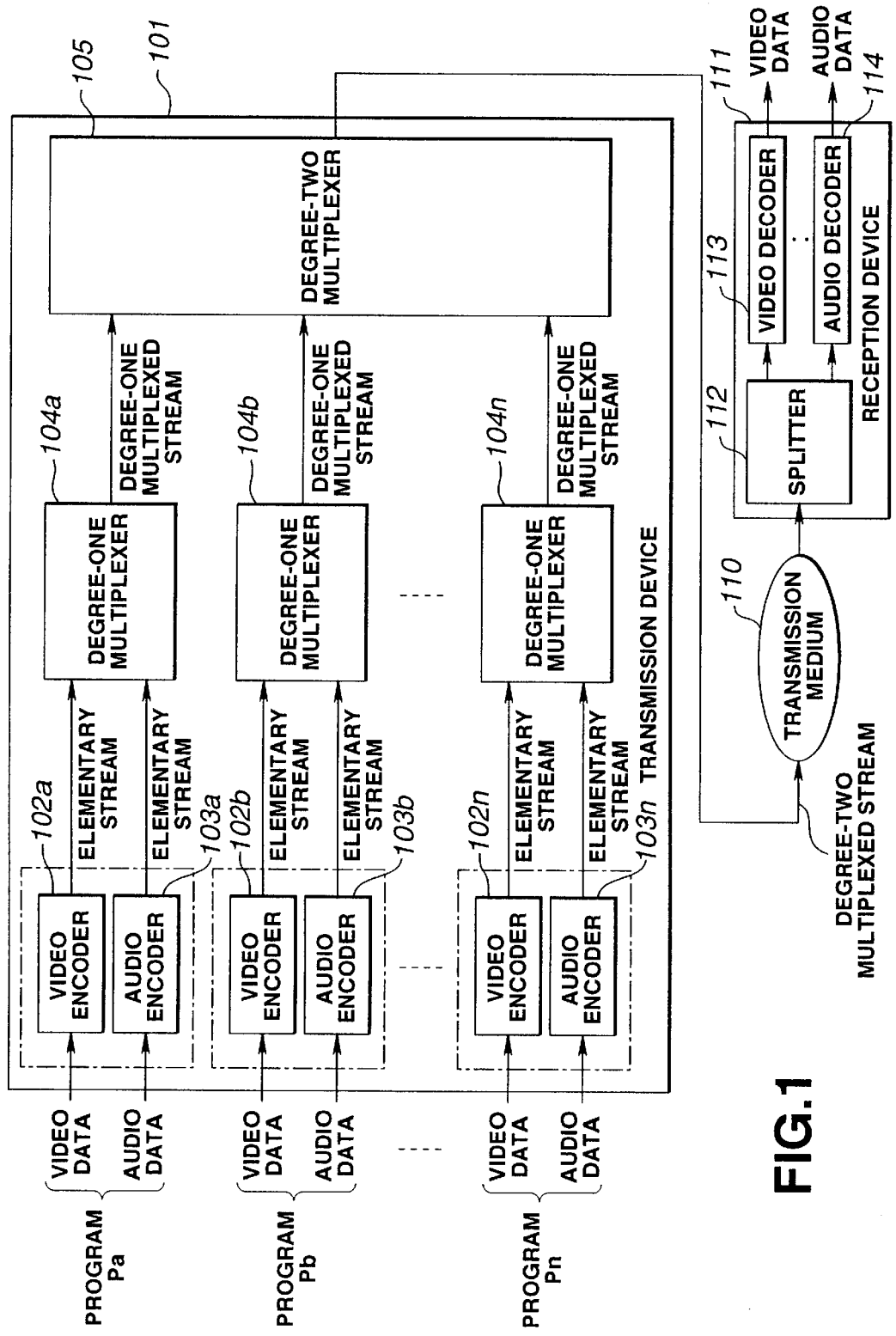
FIG. 1 is a block diagram showing a broadcast system for transmitting a transport stream used in a digital satellite broadcasting.
Figure 2:
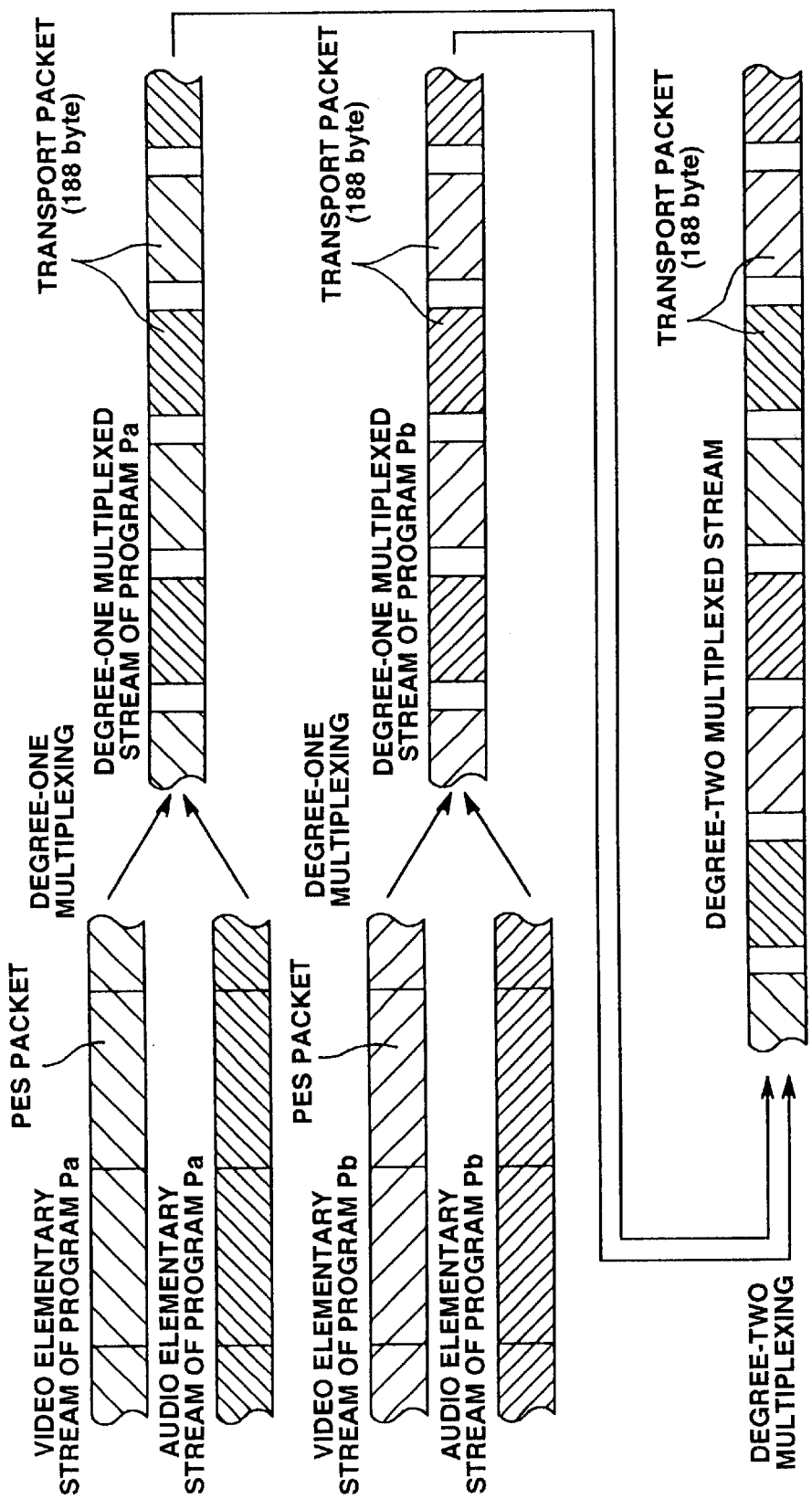
FIG. 2 shows a data structure of degree-one multiplexed streams, as transport streams prescribed by the ISO13818-1, and a degree-two multiplexed stream.

Referring to the drawings, preferred embodiments of the multiplexing system according to the present invention will be explained in detail.

This multiplexing system is applied to a digital satellite broadcast system of transmitting a transport stream made up of data multiplexed data in terms of plural programs, such as television broadcast programs or channels, as a unit, or a recording system for recording the transport stream on a recording medium. This multiplexing system is such a system in which plural degree-one multiplexed streams obtained on time-divisionally multiplexing compressed audio or video data streams, that is elementary streams, to produce a sole degree-two multiplexed stream usable by a sole transponder. Here, data contained in the degree-one multiplexed streams are equivalent to the sole channel or program of the above-mentioned television broadcast. Meanwhile, in the following explanation, the degree-one multiplexed streams and the degree-two multiplexed stream are assumed to be data streams corresponding to the transport streams prescribed in ISO13818-1.

First, a multiplexing system according to a first embodiment of the present invention is explained with reference to the drawings.

Figure 6:
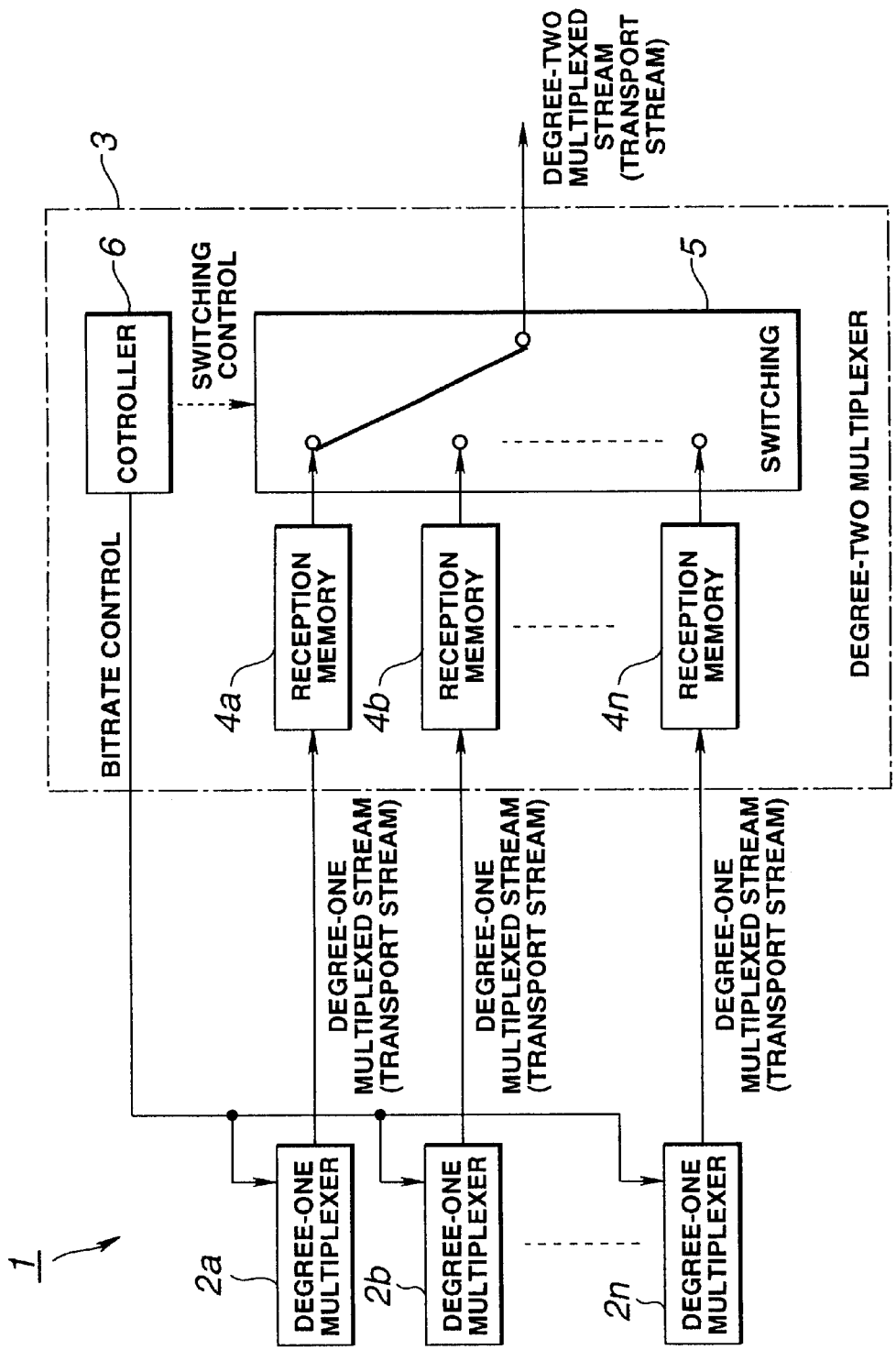
FIG. 6 is a block diagram of a multiplexing system according to a first embodiment of the present invention.

FIG. 6 shows the block diagram of the multiplexing system according to a first embodiment of the present invention.

The multiplexing system 1 includes plural degree-one multiplexers 2a to 2n, for generating degree-one multiplexed streams, and a degree-two multiplexer 3 for further multiplexing the degree-one multiplexed streams generated by the degree-one multiplexers 2a to 2n to generate a degree-two multiplexed stream. The degree-two multiplexer 3 includes plural reception memories 4a to 4n for receiving the degree-one multiplexed streams generated by the degree-one multiplexers 2a to 2n to store the received streams transiently, and a switching unit 5 for selecting the degree-one multiplexed streams stored in the reception memories 4a to 4n to degree two multiplex the selected degree-one multiplexed streams. The degree-two multiplexer 3 also includes a controller 6 which takes over switching control of the degree-one multiplexed streams multiplexed by the switching unit 5 and bitrate control of the degree-one multiplexed streams generated by the degree-one multiplexers 2a to 2n.

The degree-one multiplexers 2a to 2n time-divisionally multiplex the video or audio elementary streams, sent from a server or a video camera, not shown, every transport packet of a fixed length of 188 bytes, to generate degree-one multiplexed streams corresponding to the respective programs. The degree-one multiplexed streams, generated by the degree-one multiplexers 2a to 2n, are sent to the reception memories 4a to 4n of the degree-two multiplexer 3. The degree-one multiplexed streams may be transmitted from the degree-one multiplexers 2a to 2n to the reception memories 4a to 4n in, for example, a burst fashion, instead of in real-time. The bitrate of the degree-one multiplexed streams, generated by the degree-one multiplexers 2a to 2n, is controlled by the controller 6.

The reception memories 4a to 4n transiently store the degree-one multiplexed streams generated by the degree-one multiplexers 2a to 2n.

The switching unit 5 multiplexes the degree-one multiplexed streams, transiently stored in the reception memories 4a to 4n, on the transport packet basis, to generate a degree-two multiplexed stream. The generated degree-two multiplexed stream is sent to an external equipment, not shown, and is supplied via a communication interface over a transmission medium to a user or recorded by a rotationally driving on a recording medium.

Based on the interleaving pattern, setting the sequence of the transport packet to be selected, the controller 6 controls the switching of the switching unit 5 to set the rate allocation domain of a pre-set time duration to control the bitrate of the degree-one multiplexed streams every rate allocation domain. The interleaving pattern and the rate allocation domain will be explained simultaneously in detail.

Figure 7A:
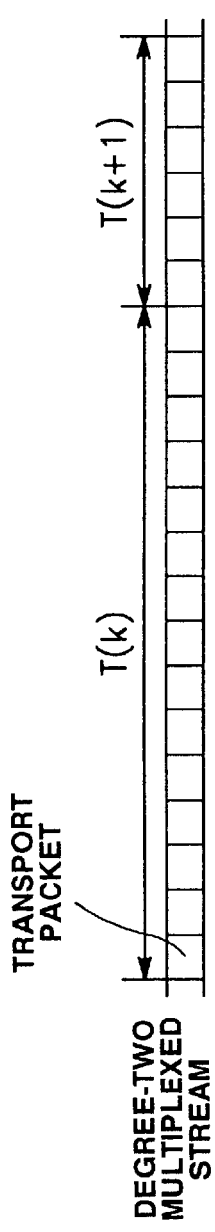
FIGS. 7A to 7C illustrate the processing of setting the bitrate of the degree-one multiplexed streams by the multiplexing system of FIG. 6.

Referring to FIG. 7, the processing of setting the bitrate of the respective degree-one multiplexed streams by the controller 6 is now explained.

Based on the bitrate of the degree-two multiplexed stream to be generated, the controller 6 sets the rate allocation domain T to the time duration corresponding to an integer number times the transport packet of the degree-two multiplexed stream. This rate allocation domain T is the setting period of the bitrate of the respective degree-one multiplexed streams sent to the degree-two multiplexer 3. The controller 6 changes the bitrates of the degree-one multiplexed streams every rate allocation domain T. That is, the controller 6 modifies the bitrates of the respective degree-one multiplexed streams at the boundaries of the rate allocation domain T, with the bitrates of the degree-one multiplexed streams remaining fixed in the rate allocation domain T.

Specifically, if the bitrate of the degree-two multiplexed stream is T, the rate allocation domain T is set to an integer number multiple of (188×8/R). If the rate allocation domain T is previously set, it suffices if the bitrate R of the degree-two multiplexed stream is set to an integer number multiple of (188×8/R). By setting the read T to this magnitude, the boundary of the rate allocation domain T coincides with the boundary of the transport packets. For example, the controller 6 sets the rate allocation domain T(k) so as to be equal to the time duration of 15 transport packets, while setting the rate allocation domain T(k+1) so as to be equal to the time duration of six transport packets.

The inside of the rate allocation domain T of the degree-two multiplexed stream is then split to set the number of the transport packets contained in the interleaved pattern IP. The numbers of the transport packets contained in the interleaved pattern IP are set so that the same number of the transport packets will be set in each of the interleaving patterns IP existing in the same rate allocation domain T.

Figure 7B:
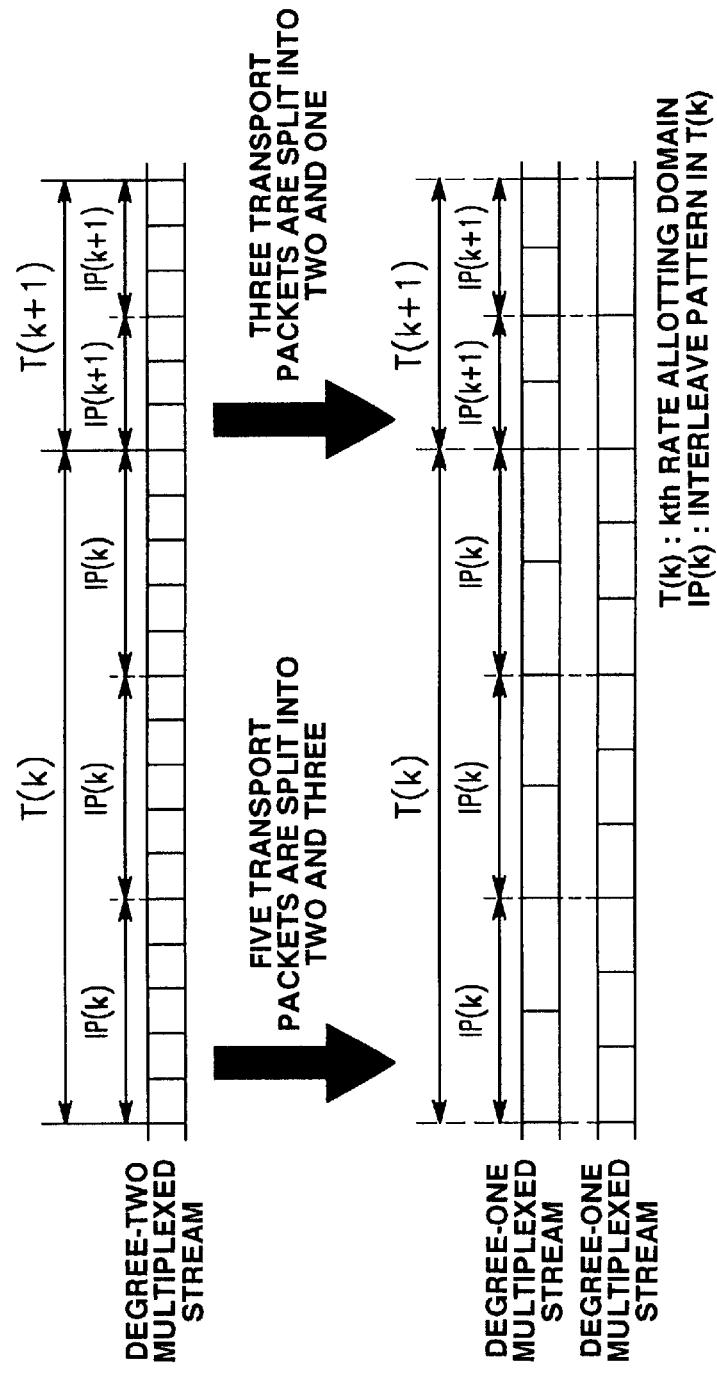

For example, the rate allocation domain T(k) in FIG. 7B is split into three interleaving patterns each made up of five transport packets. On the other hand, the rate allocation domain T(k+1) is split into two interleaving patterns IP each made up of three transport packets.

The transport packets in the interleaving patterns IP are distributed to the respective degree-one multiplexed streams. The bitrates of the respective degree-one multiplexed streams are determined from the bitrate of the degree-two multiplexed stream and the number of the distributed packets.

Figure 7C:

If two degree-one multiplexed streams are multiplexed to a sole degree-two multiplexed stream, as shown in FIG. 7C, two transport packets are allocated in the interleaving patterns IP in one of the degree-one multiplexed streams, in the rate allocation domain T(k), while three transport packets are allocated in the interleaving patterns IP in the other degree-one multiplexed stream. Thus, if the bitrate of the degree-two multiplexed stream is R, the bitrate of the former degree-one multiplexed stream is R×2/5, whereas that of the latter degree-one multiplexed stream is R×3/5.

Similarly, two transport packets are allocated in the interleaving patterns IP in one of the degree-one multiplexed streams, in the rate allocation domain T(k+1), while a sole transport packet is allocated in the interleaving patterns IP in the other degree-one multiplexed stream. Thus, if the bitrate of the degree-two multiplexed stream is R, the bitrate of the former degree-one multiplexed stream is R×2/3, whereas that of the latter degree-one multiplexed stream is R×1/3.

Thus, the controller 6 controls the bitrate of the respective degree-one multiplexed streams by setting the rate allocation domain T. Therefore, the controller 6 is able to modify the bitrates of the degree-one multiplexed streams every rate allocation domain T. Meanwhile, in a system in which the bitrates of the degree-one multiplexed streams are perpetually fixed, the interleaving pattern IP as later explained may directly be set, without setting the rate allocation domain T.

Figure 3:
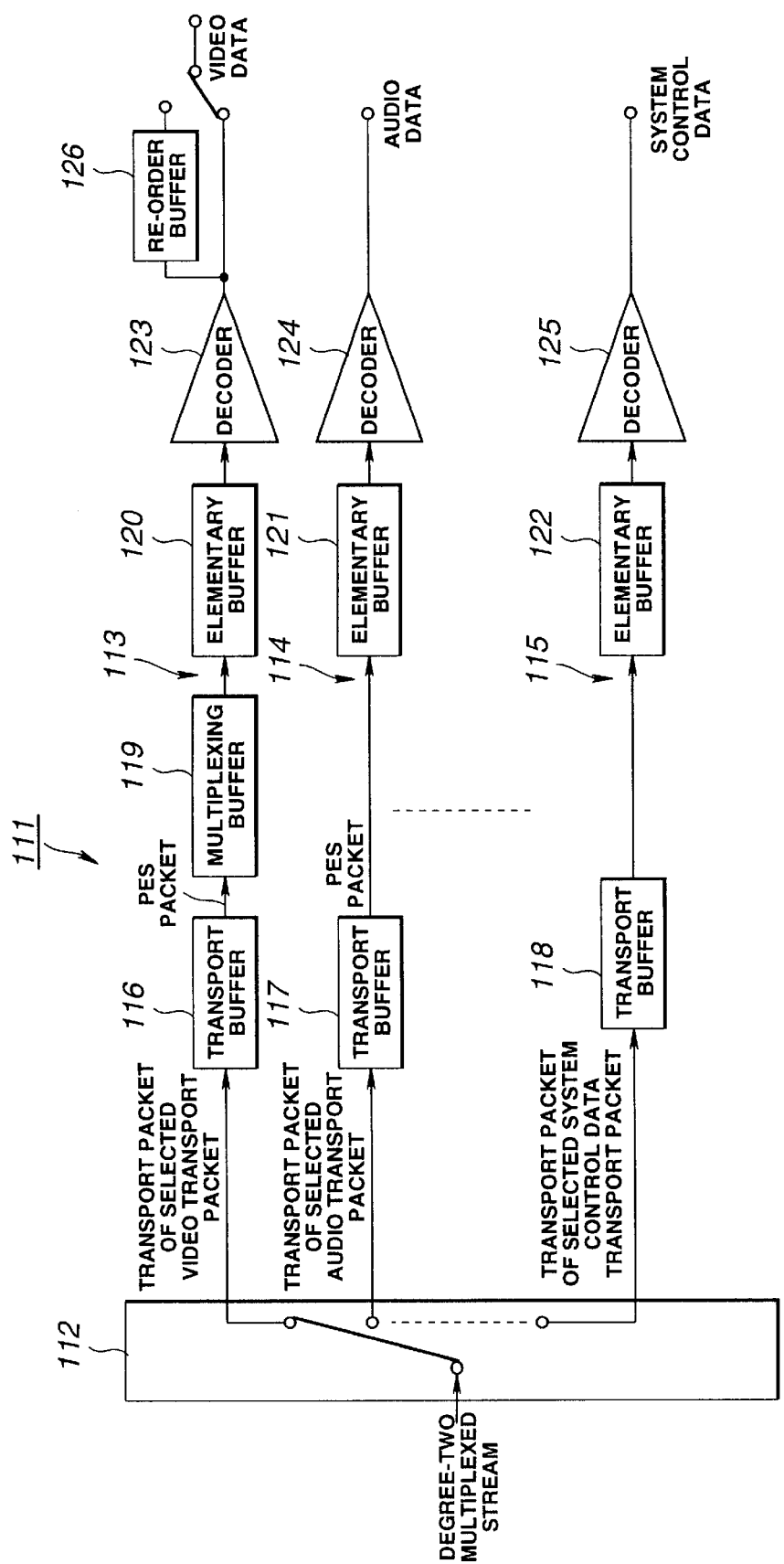
FIG. 3 is a block diagram for illustrating a decoder model of the broadcasting system.

The processing of setting the interleaving patterns IP by the controller 6 is explained by referring to FIG. 3.

The interleaving pattern IP is a repetitive pattern of the transport packets which sets the sequence of the transport packets to be selected from the respective degree-one multiplexed streams when generating the degree-two multiplexed stream. The controller 6 selects the transport packets designated in the rate allocation domain T, in accordance with the interleaving pattern IP, in order to cause the switching unit 5 to degree-two multiplex the selected transport packets. That is, the interleaving pattern IP is a pattern setting the switching sequence of the degree-one multiplexed streams selected by the switching unit 5. This pattern is set on the transport packet basis.

Referring to FIG. 3, the processing of setting the interleaving patterns P is explained, taking an example in which the bitrate of the degree-two multiplexed stream is 15 Mbps, the number of the transport packets of the interleaving patterns IP(k) in the rate allocation domain (k) in the degree-two multiplexed stream is 15 and five degree-one multiplexed streams Sa to Se having the bitrates set to Pa to Pe are fed.

The controller 6 sets the bitrates Pa(k) to Pe(k) of the respective degree-one multiplexed streams and the numbers of transport packets in the interleaving patterns IP(k) as follows:

degree-one multiplexed stream Sa: Pa(k)=2 Mbps, 2 packets
degree-one multiplexed stream Sb: Pb(k)=2 Mbps, 2 packets
degree-one multiplexed stream Sc: Pc(k)=3 Mbps, 3 packets
degree-one multiplexed stream Sd: Pd(k)=3 Mbps, 3 packets
degree-one multiplexed stream Se: Pe(k)=5 Mbps, 5 packets The controller 6 sets the interleaving patterns IP, stating the selection sequence of the transport packets, in accordance with the following procedures 1 to 4:
Procedure 1
At the leading end of the interleaving pattern IP, sole transport packets are sequentially selected from the totality of the degree-one multiplexed streams without pertinence to the bitrates set for the respective degree-one multiplexed streams.

Figure 8:
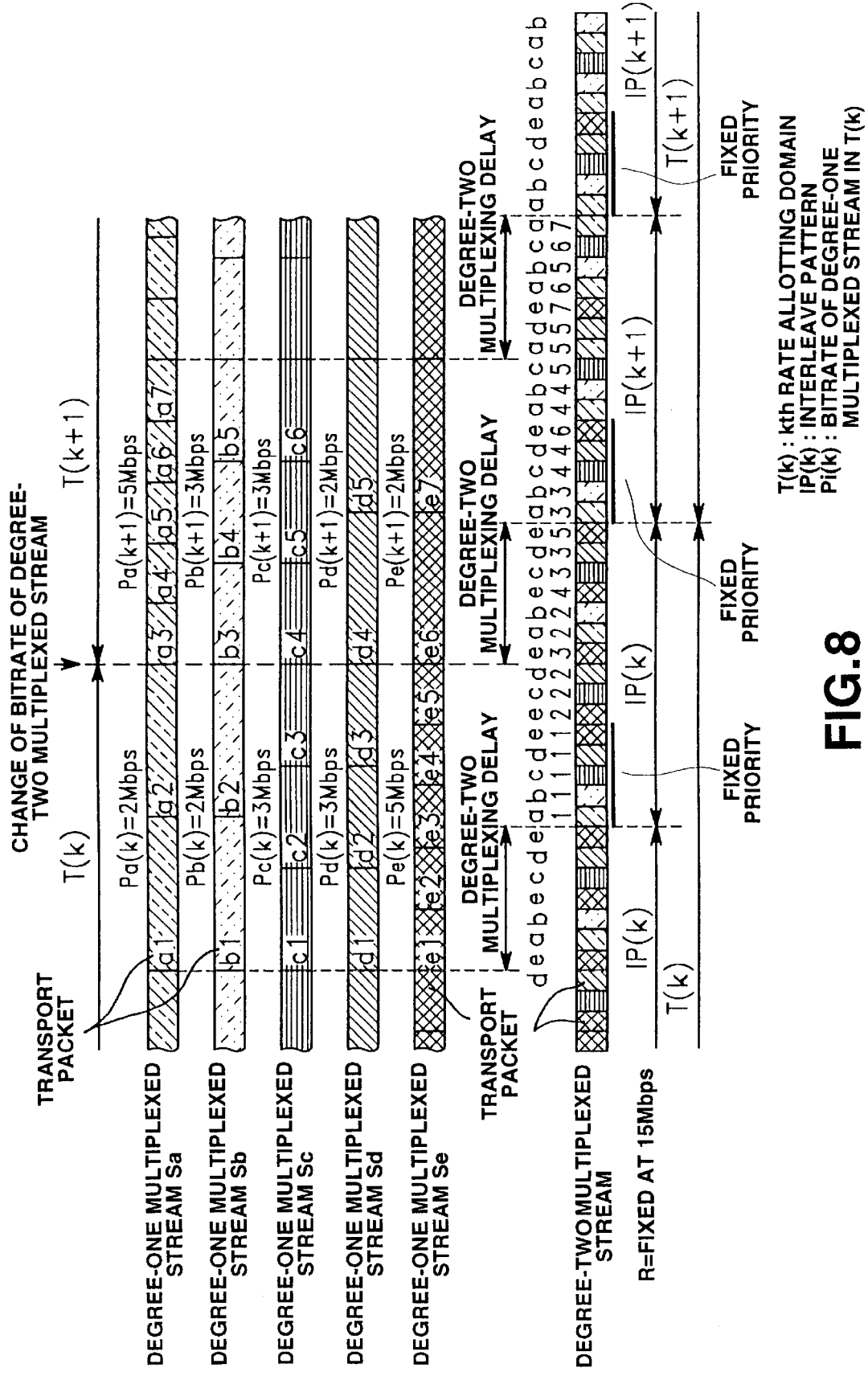
FIG. 8 illustrates the processing of setting an interleaving pattern by the multiplexing system of FIG. 6.

For example, in a pre-set rate allocation domain T(k), packets a1 to e1, as the leading packets of the degree-one multiplexed streams Sa to Se, are selected in the sequence of a1-b1-c1-d1-e1, as shown in FIG. 8.

The domain set by this sequence 1 is a fixed priority sequence in the interleaving pattern IP.
Procedure 2
If a sole transport packet is selected in the procedure 1 from each of the totality of the degree-one multiplexed streams, transport packets with longer waiting time until degree-two multiplexing of the leading bytes thereof are selected sequentially.

Since the transport packet is of a fixed length of 188 bytes, with the bitrates Pa to Pe of the respective degree-one multiplexed streams Sa to Se being known, the sequences can be determined and selected uniquely.

For example, as a packet multiplexed next to the leading packet e1 of the degree-one multiplexed stream Se in a pre-set rate allocation domain T(k), the packet e2 of the multiplexed stream Se having the highest bitrate is selected.

By selecting the transport packets in the order of the decreasing waiting time for degree-two multiplexing, degree-two multiplexing jitter can be minimized.
Procedure 3
If, in the procedure 2, the waiting time until degree-two multiplexing is equal, such a transport packet which has a higher bitrate of the degree-one multiplexed stream is selected.

By selecting the transport packet in the sequence of the decreasing bitrate in case of the equal waiting time for degree-two multiplexing, degree-two multiplexing jitter can similarly be minimized.
Procedure 4
If the bitrates are equal in the procedure 3, the transport packet is selected in the sequence of the fixed priority sequence as set in the procedure 1.

In the pre-set rate allocation domain T(k), for example, the packet c2 or the packet d2 is a candidate, by the processing of the procedure 3, as a packet selected next to the packet 2 of the multiplexed stream Se, as shown in FIG. 8. In the present procedure 4, the packet c2 is selected in accordance with above-mentioned the fixed priority sequence.

By carrying out the above procedures 1 to 4, the controller 6 is able to determine the interleaving patterns IP as the repetition pattern of the transport packet.

In the pre-set rate allocation domain T(k), an interleaving patterns IP repeating the 15 transport packets in the sequence of a1-b1-c1-d1-e1-e2-c2-d2-e3-a2-b2-e4-c3-d3-e5 is set, as shown in FIG. 8.

Based on the so-set interleaving patterns IP, the controller 6 performs changeover control of the switching unit 5. This eliminates the necessity of monitoring the memory occupation volume of the reception memories 4a to 4n, while eliminating the necessity of providing limitations on the data transfer from the degree-one multiplexed streams 2a to 2n to reception memories 4a to 4n. It is therefore possible to use a PCI bus etc, employing the burst-like transfer system, when transferring the degree-one multiplexed streams.

Meanwhile, if such burst-like transfer system is used for transferring the degree-one multiplexed streams, degree-two multiplexing delay time may be set, at the time of starting the degree-two multiplexing, such as to compensate the time of arrival of the transport packets of the degree-one multiplexed streams to be selected, as shown in FIG. 8.

In the respective degree-one multiplexers 2a to 2n, the time reference PCR is encoded in the transport packet of the fixed priority range of the interleaving patterns IP, while the PCR is not encoded in the other transport packets of the interleaving patterns IP. As for the transport packets of the fixed priority range, each one transport packet of each of the totality of the degree-one multiplexed streams is selected, while the degree-two multiplexing is executed in the pre-set sequence, so that the degree-two multiplexing jitter of the PCR is perpetually constant. Thus, each of the degree-one multiplexers 2a to 2n can pre-encode the PCR so that the degree-two multiplexing jitter will be equal to zero.

By setting the time length of the interleaving patterns IP as set by the controller 6, the provision of the ISO13818-1 stating that the PCR needs to be encoded at an interval of 0.1 sec or less is met, such that the degree-two multiplexed stream can be produced which is able to achieve synchronization on the side of the reception device.

Thus, in the degree-two multiplexer 3, there is no necessity of providing a PCR correction unit, by encoding the PCR only in the transport packet of the fixed priority sequence of the interleaving patterns IP, thus simplifying the system configuration.

Figure 4:
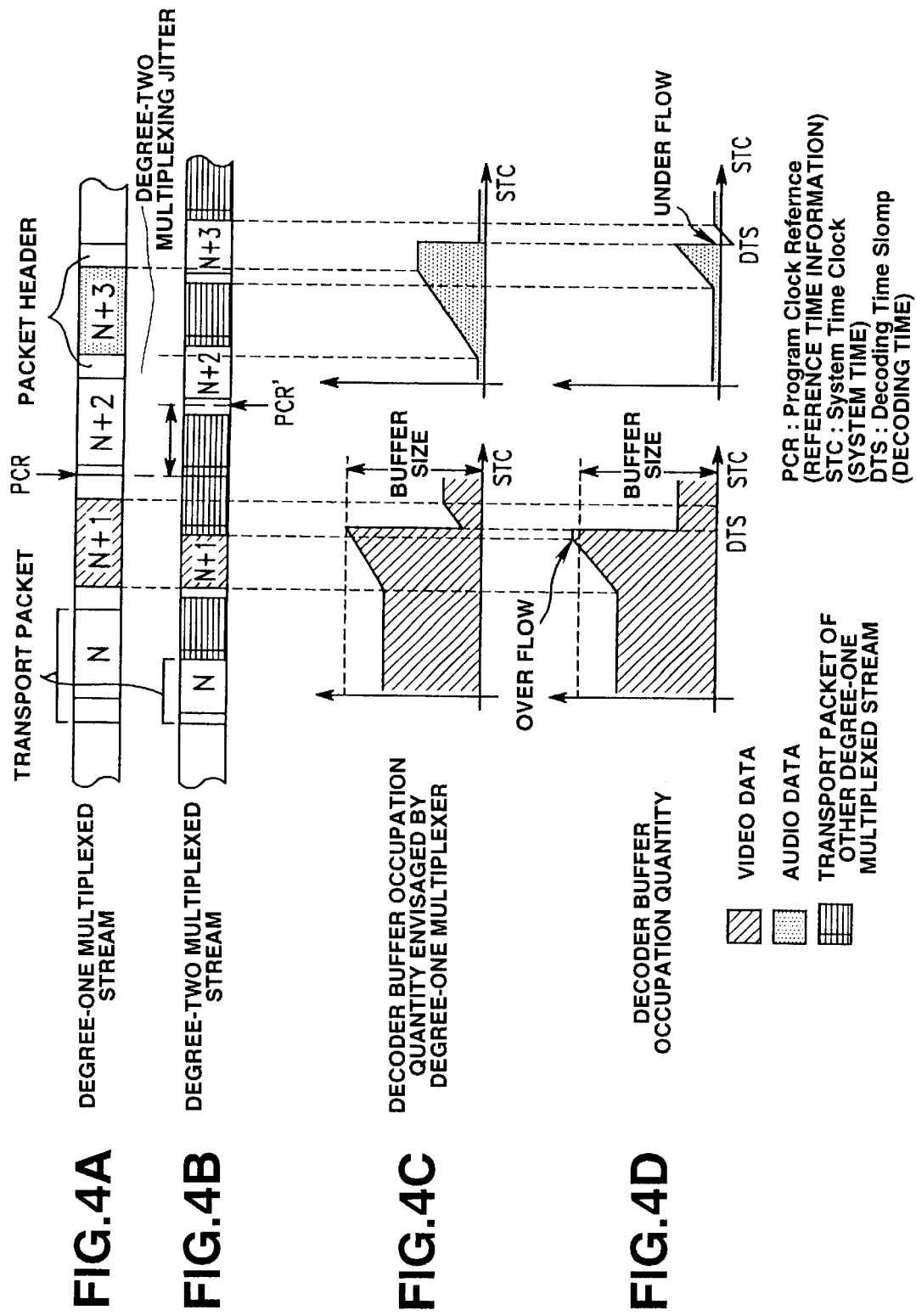
FIGS. 4A to 4D illustrate data structures of the degree-one multiplexed streams and the degree-two multiplexed stream and the buffer occupation volume of a decoder buffer for illustrating the problem due to the effect of the degree-two multiplexing jitter.
Figure 5:
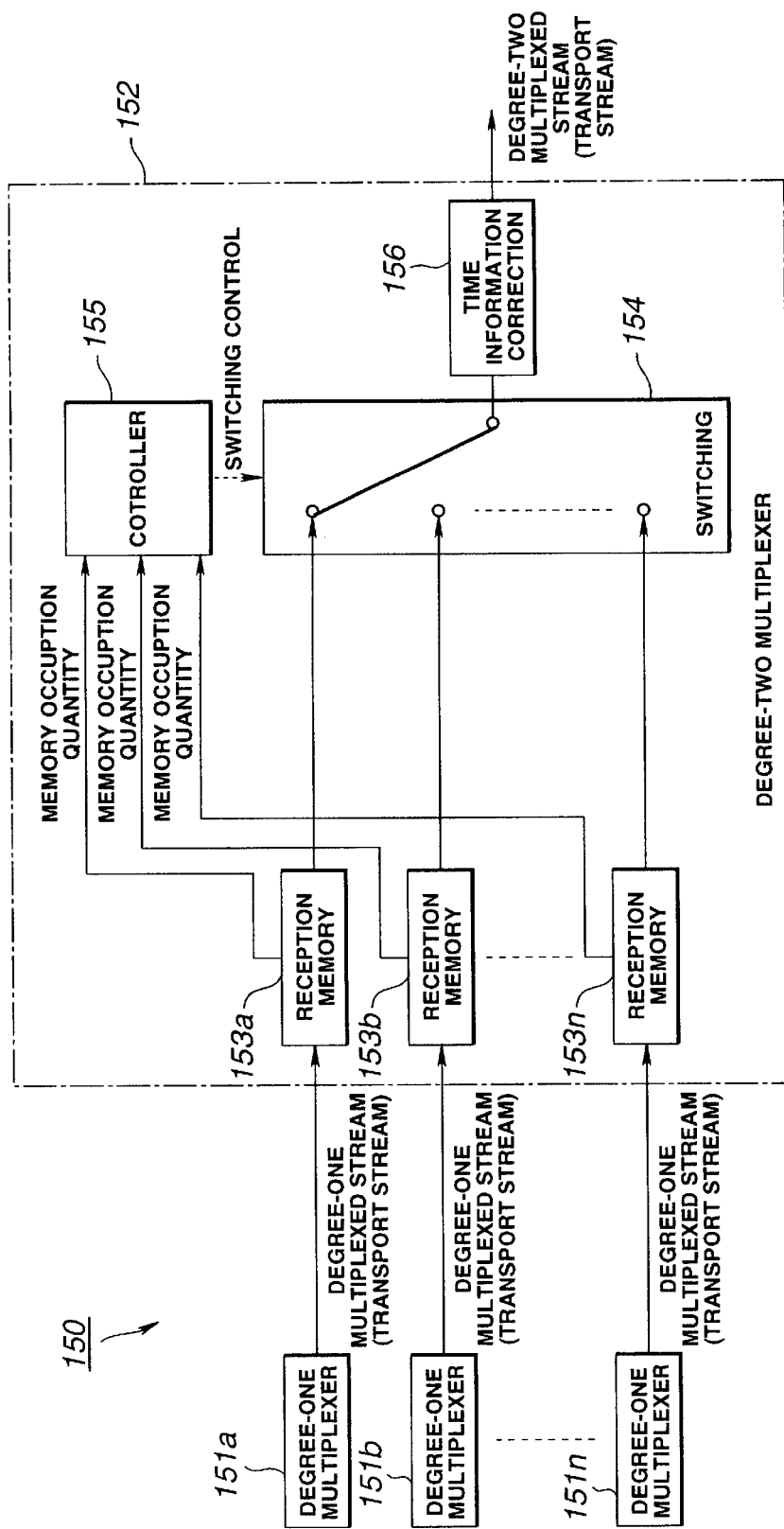
FIG. 5 is a block diagram showing a conventional multiplexing system.

Referring to FIG. 4, the degree-two multiplexing jitter produced by the degree-two multiplexer 3, is explained.

If, in the degree-two multiplexer 3, the interleaving patterns are determined on the basis of the above sequence, the maximum degree-two multiplexing jitter of the interleaving patterns IP occurs at a leading byte of the next transport packet of the degree-one multiplexed stream which is degree-two multiplexed at the leading end of the interleaving pattern and to which is allocated the maximum bitrate.

Thus, if the bitrate of the degree-two multiplexed stream is R and the number of the degree-one multiplexed streams is I, the maximum value of the degree-two multiplexing jitter can be expressed by the following equation:

(maximum value of the degree-two multiplexing jitter)=(188×8×*I*)/ R−(188×8)/*P*max(sec)

where R is the bitrate of the degree-two multiplexed stream and I is the number of the degree-one multiplexed streams.

Figure 9:
FIG. 9 illustrates the maximum value of the degree-two multiplexing jitter produced in the multiplexing system of FIG. 6.

It is assumed that the bitrate of the degree-two multiplexed stream is 15 Mbps, the number of transport packets IP(k) in the interleaving patterns IP in the rate allocation domain T(k) in the degree-two multiplexed stream is 15 and that five degree-one multiplexed streams Sa to Se having the bitrates set to Pa to Pe are fed, as shown in FIG. 9. It is also assumed that, in the pre-set rate allocation domain T(k), the bitrates Pa(k) to Pe(k) of the respective degree-one multiplexed streams in a pre-set rate allocation domain T(k) and the number of transport packets in the interleaving patterns IP(k) are set as follows:

degree-one multiplexed stream Sa: Pa(k)=5 Mbps, five packets
degree-one multiplexed stream Sb: Pb(k)=3 Mbps, three packets
degree-one multiplexed stream Sc: Pc(k)=3 Mbps, three packets
degree-one multiplexed stream Sd: Pd(k)=2 Mbps, two packets
degree-one multiplexed stream Se: Pe(k)=2 Mbps, two packets In this case, the bitrate Pa(k) of the degree-one multiplexed stream has the maximum bitrate (Pmax). The time for one transport packet of the degree-one multiplexed stream Sa is (188×8)/Pa(k)=300.8 μs, with the time for one transport packet of the degree-two multiplexed stream being (188× 8×5)/R=501.33 μsec.

In this case, the degree-two multiplexing jitter in the interleaving patterns IP can be found by:

(maximum value of the degree-two multiplexing jitter)=(188×8×*I*)/ R−(188×8)/*P*max=9188×8×5)/15M−(188×8)/5M=802.133 μsec since the maximum value of the degree-two multiplexing jitter is the value of the degree-two multiplexing jitter of the leading byte of the packet a2.

Since the degree-two multiplexer 3 generates the degree-two multiplexed stream based on the interleaving patterns IP as set by the above procedure, the maximum value of the degree-two multiplexing jitter can be set as being previously known. Therefore, the degree-one multiplexers 2*a* to 2*n* can provide pre-set margins for the upper and lower limits of the buffer occupation volume of the virtual buffer, at the time of generating the degree-one multiplexed streams, based on the previously known maximum value of the degree-two multiplexing jitter, in order to prevent failure of the decoder buffer.

With the above-described first embodiment of the multiplexing system 1, the sequence of the transport packets to be degree-two multiplexed can be uniquely set by employing the interleaving patterns IP. Thus, a burst-like bus not operating in real-time can be used at the time of transferring the degree-one multiplexed streams to the reception memories 4*a* to 4*n*. Also, even if, in the multiplexing system 1, transport packets of plural degree-one multiplexed streams enter concurrently into a waiting state for degree-two multiplexing, it is assured that the degree-two multiplexing is necessarily done within a constant small degree-two multiplexing jitter, while it is assured that the decoder buffer failure can be prohibited by doing degree-one multiplexing by the degree-one multiplexers 2*a* to 2*n* by setting previously known small margins for the upper and lower limits of the decoder buffer. Moreover, in the multiplexing system 1, since the PCR is encoded only in the transport packet of the leading end priority sequence range, there is no necessity of providing the PCR correction unit, thus simplifying the system configuration. In addition, with the multiplexing system 1, the bitrate allocated to the degree-one multiplexed streams can be modified by changing the interleaving pattern, so that it is possible to perform statistic multiplexing control of providing a constant bitrate of the degree-two multiplexed stream which is the comprehensive bitrate of the degree-one multiplexed streams, with the bitrates of the degree-one multiplexed streams being variable. It is therefore possible to distribute the bitrates depending on the encoding difficulty of the degree-one multiplexed streams to improve the overall picture quality.

In the multiplexing system 1, the system information, for example, concerning the respective streams can be added in the degree-one multiplexed streams. The system information may be exemplified by the ancillary information, such as table information, which should be referred to when selecting the video or audio streams making up a particular one of plural programs by the decoder. In the present multiplexing system 1, the system information can be multiplexed into degree-one multiplexed streams by distributing the bitrates in the same manner as in the remaining degree-one multiplexed streams.

Also, in the multiplexing system 1, since the rate allocation domain T, interleaving patterns IP, bitrate of the degree-one multiplexed streams and the bitrate of the degree-two multiplexed stream represent interrelated parameters, control may be performed to assure an optimum degree-two multiplexing by reciprocally adjusting these parameters.

For example, the bitrate to be allocated to the degree-one multiplexed streams can be previously set, or alternatively, the bitrates of the interleaving patterns IP or the degree-two multiplexed stream can be set on the basis of the bitrates of the degree-one multiplexed streams of pre-set bitrates supplied from a server etc. Alternatively, the decoder margins for the decoder buffers of the degree-one multiplexers 2*a* to 2*n* may be previously set to set the bitrates of the interleaving patterns IP or the degree-two multiplexed stream in order to enable degree-two multiplexing to be performed within this pre-set margin.

The multiplexing system according to a second embodiment of the present invention will now be explained.

In the following explanation of the second embodiment of the multiplexing system, parts or components similar to those of the first embodiment are depicted by the same reference numerals and the corresponding description is omitted for simplicity.

Figure 10:
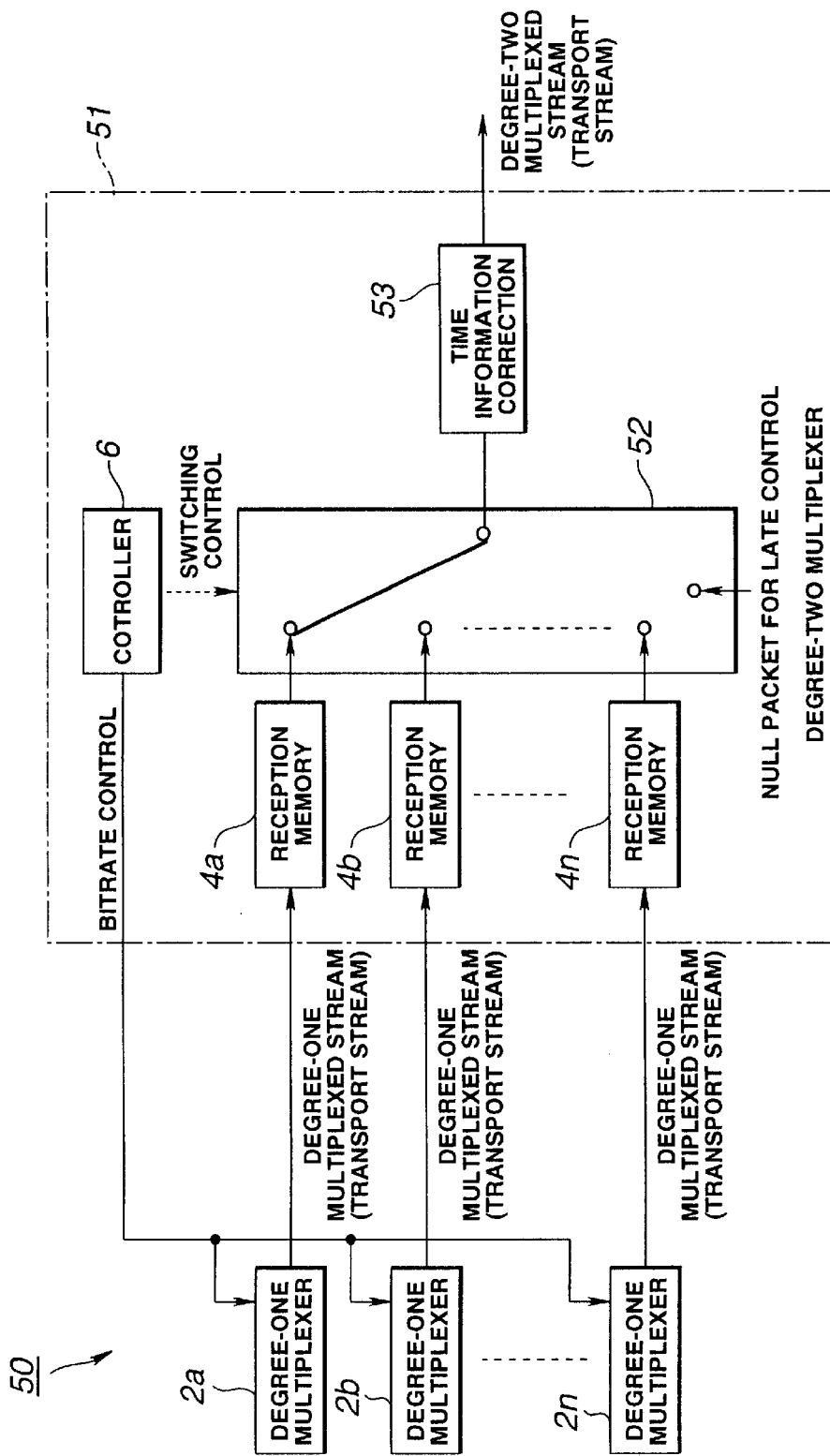
FIG. 10 is a block diagram of a multiplexing system according to a second embodiment of the present invention.
Figure 11:
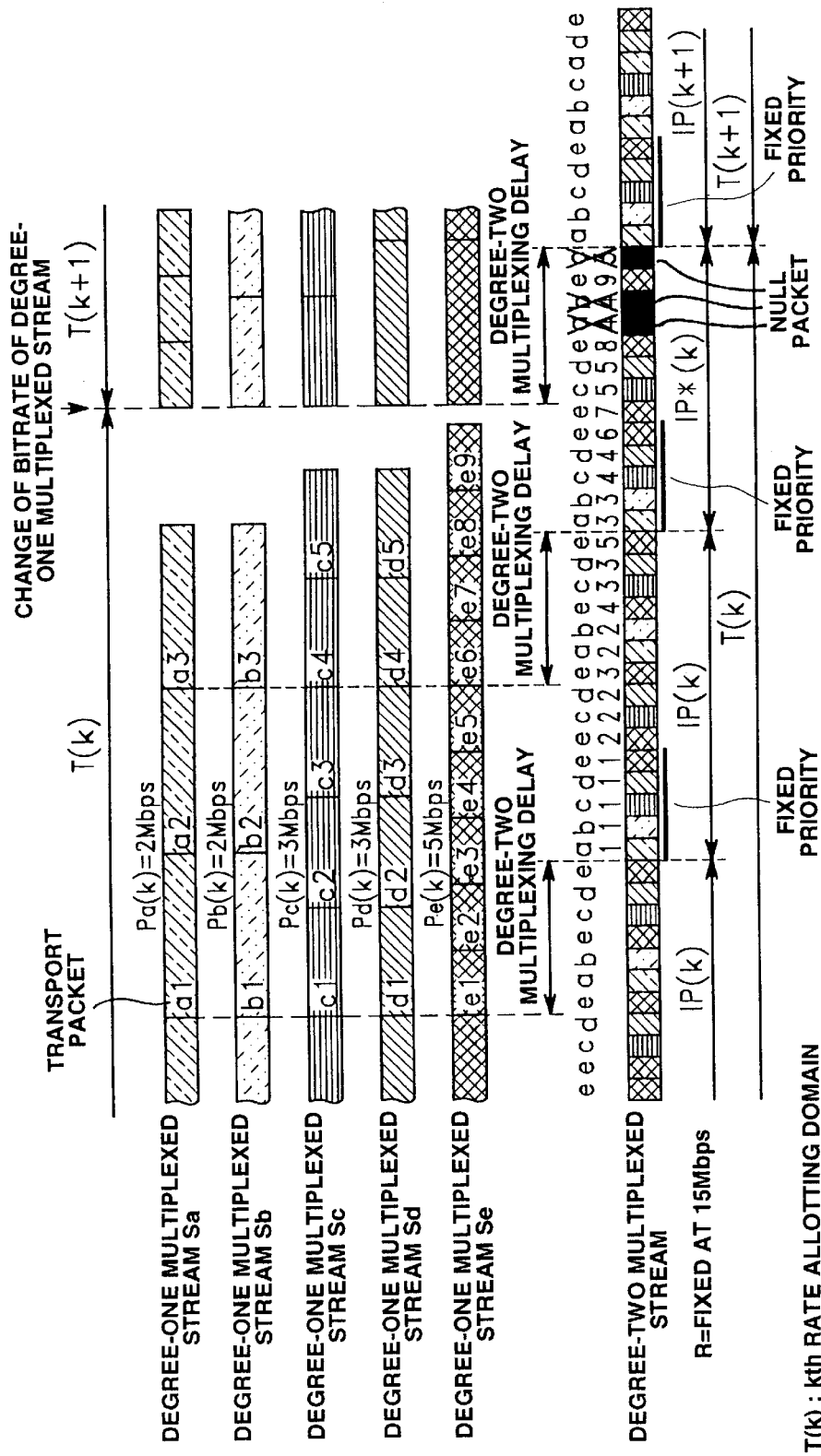
FIG. 11 illustrates the processing of setting an interleaving pattern in the multiplexing system of FIG. 10 in case of setting the interleaving patten and the bitrates of the degree-one multiplexed streams without dependancy upon the rate allocation domains.

FIG. 10 shows a block diagram of a multiplexing system 50 of the second embodiment of the present invention.

The multiplexing system 50 includes plural degree-one multiplexers 2*a* to 2*n*, for generating degree-one multiplexed streams, and a degree-two multiplexer 51 for further multiplexing the degree-one multiplexed streams from the degree-one multiplexers 2*a* to 2*n* to generate a degree-two multiplexed stream. The degree-two multiplexer 51 includes plural reception memories 4*a* to 4*n* for receiving and for transiently storing the degree-one multiplexed streams generated by the degree-one multiplexers 2*a* to 2*n*, and a switching unit 52 for selecting the degree-one multiplexed streams stored in the reception memories 4a to 4n and rate-controlling null packets for degree-two multiplexing. The degree-two multiplexer 51 also includes a controller 6 for controlling the bitrates of the degree-one multiplexed streams generated by the degree-one multiplexers 2a to 2n and a time information correction unit 53 for correcting the PCR encoded in the degree-two multiplexed stream generated by the switching unit 52.

This multiplexing system 50 is applied when determining the bitrate of the degree-one multiplexed streams or the interleaving patterns IP without dependency upon the rate allocation domain T or if the transport packets of plural degree-two multiplexed streams cannot be set within the rate allocation domain T.

The switching unit 52 of the degree-two multiplexer 51 is fed with the null packet for bitrate adjustment. The switching unit 52 introduces the null packet into the degree-two multiplexed stream under control by the controller 6. This null packet, which is a transport packet prescribed under ISO13818-1, is data discarded without being introduced by the reception device side into the decoder buffer. This null packet is occasionally inserted to maintain a constant bitrate of the degree-two multiplexed stream at a boundary of the rate allocation domain T when the bitrates of interleaving patterns IP and the respective degree-one multiplexed streams are set without dependency upon the rate allocation domain T.

The time information correction unit 53 rewrites the value of the PCR of the degree-two multiplexed stream, generated by the switching unit 52, to the actual degree-two multiplexing timing. The time information correction unit 53 corrects the PCR to reduce the degree-two multiplexing jitter to zero if the transport packets of an integer number of degree-two multiplexed stream cannot be set so as to be within the rate allocation domain T such that there exists a transport packet of the degree-two multiplexed stream lying astride two rate allocation domains T.

The manner of setting the interleaving patterns IP and the bitrates of the respective degree-one multiplexed streams without dependency upon the rate allocation domain T is explained with reference to FIG. 6.

If the bitrates of the respective degree-one multiplexed streams are set without dependency upon the rate allocation domain T, the boundary between the transport packets of the respective degree-one multiplexed streams Sa to Se are not coincident with those of the rate allocation domains T. Thus, the controller 6 degree-two multiplexes the transport packets of the degree-one multiplexed stream lying across the rate allocation domain T as from the next new rate allocation domain T(k+1), instead of within the rate allocation domain T(k).

Similarly, if the interleaving patterns IP is set without dependency upon the rate allocation domain T, the boundary of the interleaving patterns IP is not coincident with that of the rate allocation domain T(k). Thus, the controller 6 aborts the interleaving patterns IP lying astride the rate allocation domains T at the boundary of the rate allocation domains T. Since the transport packet TP lying astride the rate allocation domains T(k) is not outputted in the degree-one multiplexed form, the transport packet of the degree-one multiplexed stream belonging to a given rate allocation domain T(k) is necessarily degree-two multiplexed within the rate allocation domain T(k), even on aborting the interleaving pattern IP.

If the boundary of the interleaving patterns IP or transport packets of the degree-one multiplexed streams Sa to Se lie astride the boundary of the rate allocation domain T(k) such that there exists no transport packet to be degree-two multiplexed, the switching unit 52 inserts a null packet in order to maintain a constant bitrate of the degree-two multiplexed stream.

With the multiplexing system 50, as described above, it is possible to uniquely set the sequence of the transport packets to be degree-two multiplexed, even if the interleaving patterns IP and the bitrates of the respective degree-one multiplexed streams are set without dependency upon the rate allocation domain T, such that it becomes possible to use a burst-like bus not operating in real-time when transferring the degree-one multiplexed streams to the reception memories 4a to 4n. Also, in the multiplexing system 50, degree-two multiplexing can be performed without fail within a constant small degree-two multiplexing jitter. The maximum value of the degree-two multiplexing jitter in the pre-set interleaving patterns IP can similarly be found in the same manner as the above-described first embodiment of the multiplexing system 1. Failure of the decoder buffer is reliably prohibited by the respective degree-one multiplexers 2a to 2n taking previously known small margins for the upper and lower limits of the decoder buffer in performing the degree-one multiplexing. Also, in the multiplexing system 50, PCR correction is not required if the PCR is encoded only in the transport packet of the leading end priority sequence range. In addition, the standard of the ISO13818-1 can be coped with by setting the time duration of the interleaving patterns IP to not longer than 0.1 sec.

The case in which an integer number of transport packet(s) of a degree-two multiplexed stream cannot be set so as to be within the rate allocation domain T is explained.

The case in which an integer number of transport packet(s) of a degree-two multiplexed stream cannot be set so as to be within the rate allocation domain T is such a case in which the bitrate of the degree-two multiplexed stream is set by a transmission channel due to the broadcasting configuration or in which the rate allocation domain T is determined by the frame interval of picture data or by constraints of the degree-one multiplexers 2a to 2n.

Figure 12:
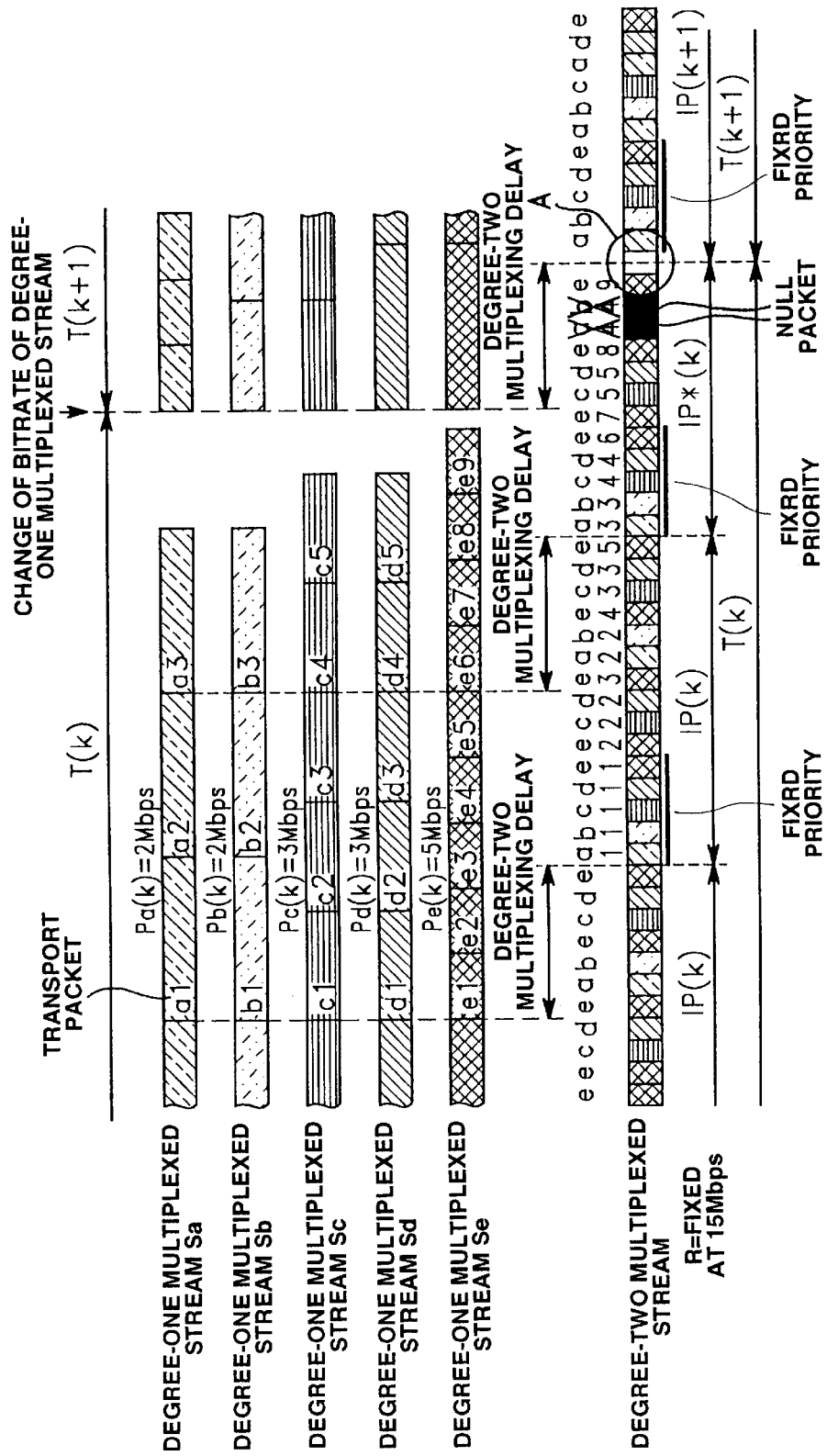
FIG. 12 illustrates the handling of the degree-two multiplexed stream in case the transport packet of an integer number of the degree-two multiplexed streams cannot be set so as to be comprised within a rate allocation domain.
Figure 13A:
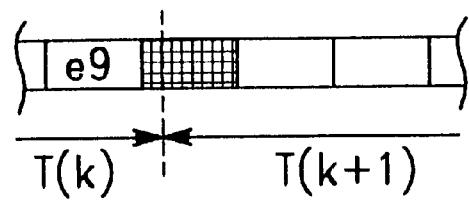
FIGS. 13A to 13C illustrate the handling of the degree-two multiplexed stream in case the transport packet of an integer number of the degree-two multiplexed streams cannot be set so as to be comprised within a rate allocation domain.

In such case, as shown in FIG. 12 and FIG. 13A showing a portion A of FIG. 12 to an enlarged scale, there is present a transport packet of the degree-two multiplexed stream astride the boundary of the rate allocation domain T. If this transport packet is deleted, the bitrate of three-dimensional degree-two multiplexed stream is changed. Thus, the degree-two multiplexer 51 handles the transport packet of the degree-two multiplexed stream lying astride the rate allocation domain T in the following manner.

Figure 13B:
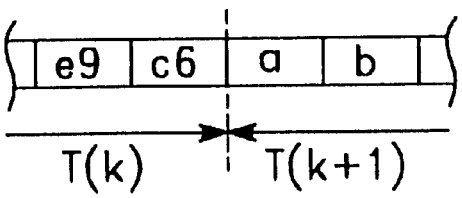

That is, if any transport packet of the degree-one multiplexed stream belonging to the rate allocation domain T(k) to be degree-two multiplexed is left in a transport packet of the degree-two multiplexed stream astride a pre-set rate allocation domain T(k) and the next rate allocation domain T(k+1), the degree-two multiplexer 51 deems that the transport packet in question belongs to the rate allocation domain T(k), and accordingly multiplexes the transport packet in question, as shown in FIG. 13B.

Figure 13C:
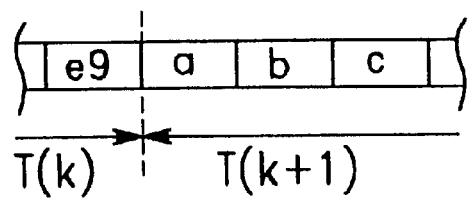

On the other hand, if no transport packet of the degree-one multiplexed stream belonging to the rate allocation domain T(k) to be degree-two multiplexed is left in a transport packet of the degree-two multiplexed stream astride a pre-set rate allocation domain T(k) and the next rate allocation domain T(k+1), the degree-two multiplexer 51 deems that the transport packet in question belongs to the next rate allocation domain T(k+1), and accordingly multiplexes the transport packet in question, as shown in FIG. 13C.

In the multiplexing system 50, if an integer number of transport packets of the degree-two multiplexed stream cannot be set so as to be within a rate allocation domain T, it is possible to uniquely set in advance the sequence of te transport packets to be degree-two multiplexed, thus enabling the use of a burst-like bus not operating in real-time when transferring the degree-one multiplexed streams to the reception memories 4a to 4n. Also, in the multiplexing system 50, degree-two multiplexing can be achieved without fail within a constant small degree-two multiplexing jitter.

Meanwhile, if an integer number of transport packets of the degree-two multiplexed stream cannot be set so as to be within a rate allocation domain T, there exists a transport packet lying astride the boundary of two interleaving patterns IP. Therefore, the maximum value of the degree-two multiplexing jitter in a pre-set interleaving patterns IP can be found by the following equation:

(maximum value of the degree-two multiplexing jitter)=(188×8×(I+1)/R−(188×8)/Pmax(sec).

Since the maximum value of the degree-two multiplexing jitter can be set in this manner in the multiplexing system 50, failure of the decoder buffer can be prohibited from occurring reliably by the respective degree-one multiplexers 2a to 2n setting previously known small margins as the upper and lower limit values of the decoder buffer in order to do the degree-one multiplexing.

Also, if an integer number of transport packets of the degree-two multiplexed stream cannot be set so as to be within a rate allocation domain T, there exists a transport packet lying astride the boundary of two interleaving patterns IP, and hence the degree-two multiplexing jitter is produced in the transport packet of the fixed priority sequence range into which is encoded the PCR. Thus, the multiplexing system 50 causes the time information correction unit 53 to correct the PCR value.

What is claimed is:

1. A multiplexing device for digital signals for receiving a plurality of degree-one multiplexed streams, obtained on packetizing one or more bitstreams of the digital signals to form packets and multiplexing the respective bitstreams on the packet basis, and for multiplexing the received plural degree-one multiplexed streams, comprising:

reception means for receiving the plural degree-one multiplexed streams;

multiplexing means for time-divisionally multiplexing the respective degree-one multiplexed streams received from said reception means to generate a degree-two multiplexed stream; and control means for setting the sequence of time-divisional multiplexing of said packets as interleaving patterns repeated at a pre-set period and for controlling the multiplexing means based on said interleaving patterns;

wherein said control means sets said interleaving patterns so as to minimize degree-two multiplexing jitter based on selecting a transport packet in a sequence of a decreasing bitrate in the case of an equal waiting time for said degree-two multiplexed stream.

2. The digital signal multiplexing device according to claim 1 wherein said control means controls the bitrates of the respective degree-one multiplexed streams based on said interleaving patterns and the bitrate of the degree-two multiplexed stream.

3. The digital signal multiplexing device according to claim 1 wherein said control means sets said interleaving patterns based on the bitrates of said degree-one multiplexed streams and the bitrate of said degree-two multiplexed stream.

4. The digital signal multiplexing device according to claim 1 wherein said control means sets a rate allocation domain and sets said interleaving patterns every rate allocation domain to control the bitrates of said degree-one multiplexed streams.

5. The digital signal multiplexing device according to claim 4 wherein said control means sets said rate allocation domain to time equal to an integer number times the output time of said packets of the degree-two multiplexed stream.

6. The digital signal multiplexing device according to claim 4 wherein said control means sets said rate allocation domain to time equal to an integer number times the output time of said interleaving pattern.

7. The digital signal multiplexing device according to claim 4 wherein said control means distributes the number of packets of the degree-two multiplexed stream contained in said rate allocation domain to the respective degree-one multiplexed streams to set said interleaving patterns.

8. The digital signal multiplexing device according to claim 4 wherein said control means is responsive to packets contained in said interleaving patterns to control the bitrates of said degree-one multiplexed streams.

9. The digital signal multiplexing device according to claim 4 wherein, if there exists a packet of the degree-one multiplexed stream lying astride the boundary of said rate allocation domains, said multiplexing means does not multiplex the packet within its rate allocation domain, and wherein, if there exists no packet of the degree-one multiplexed stream to be multiplexed in said interleaving pattern, said multiplexing means multiplexes a packet composed of dummy data in said interleaving pattern.

10. The digital signal multiplexing device according to claim 4 wherein, if there exists a packet of the degree-one multiplexed stream lying astride the boundary of said rate allocation domain, and if the packet is left in a rate allocation domain to be multiplexed, said multiplexing means multiplexes the packet on the assumption that said packet belongs to the rate allocation domain, and wherein, if the packet is not left in the rate allocation domain to be multiplexed, said multiplexing means multiplexes the packet on the assumption that said packet belongs to the next rate allocation domain.

11. The digital signal multiplexing device according to claim 1 wherein said control means controls the amount of the code generated in each degree-one multiplexed stream, based on the maximum value of time deviation generated between an output timing of a pre-set packet of the degree-one multiplexed stream and said packet of the degree-two multiplexed stream due to the interleaving patterns, in such a manner as to prevent failure of a decoder buffer provided upstream of a decoder.

12. The digital signal multiplexing device according to claim 1 wherein said control means sets the maximum value of the time deviation generated between an output timing of a pre-set packet of the degree-one multiplexed stream and said packet of the degree-two multiplexed stream, based on the amount of the code of each degree-one multiplexed stream controlled so as not to cause failure of a decoder buffer provided upstream of the decoder, in order to set said interleaving patterns.

13. The digital signal multiplexing device according to claim 12 wherein said control means sets the time length of said interleaving patterns so as to be within the maximum interval of the PCR as a time reference value appended to the degree-two multiplexed stream.

14. The digital signal multiplexing device according to claim 1 wherein said control means sets said interleaving pattern so that, at the leading end thereof, each one packet will be selected from the totality of said degree-one multiplexed streams.

15. The digital signal multiplexing device according to claim 14 wherein said reception means receives the degree-one multiplexed streams in the packets of the leading ends of which are attached time reference values.

16. The digital signal multiplexing device according to claim 15 wherein said reception means receives a degree-one multiplexed stream, as prescribed in ISO13818-1, having a program clock reference PCR attached to a transport packet at the leading end thereof.

17. The digital signal multiplexing device according to claim 16 wherein the time length of the interleaving pattern is set so as to be within the maximum interval of the PCR as prescribed in ISO13818-1.

18. The digital signal multiplexing device according to claim 1 wherein said multiplexing means time-divisionally multiplexes said degree-one multiplexed streams after lapse of time longer than the delay time caused by transfer of said degree-one multiplexed streams.

19. The digital signal multiplexing device according to claim 1 wherein said reception means receives a transport stream as prescribed by ISO13818-1, and wherein said multiplexing means generates a transport stream as prescribed by ISO13818-1.

20. A method for multiplexing digital signals comprising:
  receiving a plurality of degree-one multiplexed streams obtained on packetizing one or more bitstreams of the digital signals to form packets and on multiplexing the bitstreams on the packet basis;
  setting the sequence of time-divisional multiplexing of the packets as interleaving patterns repeated at a preset period; and
  controlling the packets selected on the basis of the interleaving patterns thus set to time-divisionally multiplex the received degree-one multiplexed streams on the packet basis to generate a degree-two multiplexed stream,
  wherein said interleaving patterns are set so as to minimize degree-two multiplexing jitter based on selecting a transport packet in a sequence of a decreasing bitrate in the case of an equal waiting time for said degree-two multiplexed stream.

21. The digital signal multiplexing method according to claim 20 wherein said rate allocation domain is set to time equal to an integer number times the output time of said packets of the degree-two multiplexed stream.

22. The digital signal multiplexing method according to claim 20 wherein said rate allocation domain is set to time equal to an integer number times the output time of said interleaving pattern.

23. The digital signal multiplexing method according to claim 20 wherein, if there exists a packet of the degree-one multiplexed stream lying astride the boundary of said rate allocation domains, the packet is not multiplexed within its rate allocation domain, and wherein, if there exists no packet of the degree-one multiplexed stream to be multiplexed in said interleaving pattern, a packet composed of dummy data is multiplexed in said interleaving pattern.

24. The digital signal multiplexing method according to claim 20 wherein, if there exists a packet of the degree-one multiplexed stream lying astride the boundary of said rate allocation domain, and if the packet is left in a rate allocation domain to be multiplexed, the packet is multiplexed on the assumption that said packet belongs to the rate allocation domain, and wherein, if the packet is not left in the rate allocation domain to be multiplexed, the packet is multiplexed on the assumption that said packet belongs to the next rate allocation domain.

25. The digital signal multiplexing method according to claim 20 wherein a plurality of degree-one multiplexed streams are received, in which the amount of the code generated is controlled based on the maximum value of time deviation generated between an output timing of a pre-set packet of the degree-one multiplexed stream and said packet of the degree-two multiplexed stream, due to the interleaving patterns, in such a manner as to prevent failure of a decoder buffer provided upstream of a decoder.

26. The digital signal multiplexing method according to claim 20 wherein the maximum value of the time deviation generated between an output timing of a pre-set packet of the degree-one multiplexed stream and said packet of the degree-two multiplexed stream is set based on the amount of the code of each degree-one multiplexed stream controlled so as not to cause failure of a decoder buffer provided upstream of the decoder, in order to set said interleaving patterns.

27. The digital signal multiplexing method according to claim 26 the time length of said interleaving patterns is set so as to be within the maximum interval of the PCR as a time reference value appended to the degree-two multiplexed stream.

28. The digital signal multiplexing method according to claim 26 wherein the degree-one multiplexed streams, in the packets of the leading ends of which are attached time reference values, are received.

29. The digital signal multiplexing method according to claim 28 wherein a degree-one multiplexed stream, as prescribed in ISO13818-1, having a program clock reference PCR attached to a transport packet at the leading end thereof, is received.

30. The digital signal multiplexing method according to claim 29 wherein the time length of the interleaving pattern is set so as to be within the maximum interval of the PCR as prescribed in ISO13818-1.

31. A recording medium having recorded thereon a degree-two multiplexed stream obtained on multiplexing one or more bitstreams of the digital signals to generate a plurality of degree-one multiplexed streams obtained on multiplexing the respective bitstreams on the packet basis, receiving said degree-one multiplexed streams, setting the time-divisional multiplexing sequence of the packets as interleaving patterns repeated at a pre-set period, controlling the packets to be selected based on the set interleaving patterns and time-divisionally multiplexing the received degree-one multiplexed streams on the packet basis to generate a degree-two multiplexed stream; and recording the degree-two multiplexed stream, wherein said interleaving patterns are set so as to minimize degree-two multiplexing jitter based on selecting a transport packet in a sequence of a decreasing bitrate in the case of an equal waiting time for said degree-two multiplexed stream.

* * * * *